United States Patent
Laurent et al.

(10) Patent No.: US 10,237,919 B2
(45) Date of Patent: Mar. 19, 2019

(54) FILM-TYPE HEATING ELEMENT

(75) Inventors: Stephane Laurent, Clichy (FR); Emilie Charlet, Paris (FR); Bernard Nghiem, Arsy (FR); Emmanuelle Peter, Aix en Provence (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 437 days.

(21) Appl. No.: 14/124,414

(22) PCT Filed: May 31, 2012

(86) PCT No.: PCT/FR2012/051221
§ 371 (c)(1),
(2), (4) Date: Dec. 6, 2013

(87) PCT Pub. No.: WO2012/168628
PCT Pub. Date: Dec. 13, 2012

(65) Prior Publication Data
US 2014/0091073 A1   Apr. 3, 2014

(30) Foreign Application Priority Data
Jun. 7, 2011 (FR) .................................... 11 54954

(51) Int. Cl.
*H05B 1/00* (2006.01)
*H05B 3/06* (2006.01)
(Continued)

(52) U.S. Cl.
CPC ..... *H05B 3/0014* (2013.01); *B32B 17/10036* (2013.01); *B32B 17/10174* (2013.01);
(Continued)

(58) Field of Classification Search
None
See application file for complete search history.

(56) References Cited

U.S. PATENT DOCUMENTS 5,493,102 A   2/1996 Takase et al.
5,750,267 A   5/1998 Takase et al.
(Continued)

FOREIGN PATENT DOCUMENTS

CA   2710361          1/2011
DE   1256812 B   * 12/1967
(Continued)

OTHER PUBLICATIONS

DE1256812B, "Heated Glass," Jendeleit, Dec. 1967, partial translation.*

(Continued)

*Primary Examiner* — Joseph M Pelham
(74) *Attorney, Agent, or Firm* — Oblon, McClelland, Maier & Neustadt, L.L.P.

(57) ABSTRACT

The invention relates to a heating element comprising a substrate (1) equipped with a thin-film multilayer, the thin-film multilayer comprising a film (3) suited to being heated, this film having a sheet resistance of between 20 and 200 Ω/square, the heating element also comprising two conductive collectors suited to being fed with electrical voltage, the film suited to being heated being a transparent electrically conductive oxide film and the film (3) suited to being heated not being machined and being electrically connected to the two conductive collectors, the film (3) suited to being heated having a thickness of between 50 nm and 300 nm.
The invention allows a heating element, with a film suited to being heated that is simple to manufacture, to be easily installed in an electric vehicle or easily connected to the national grid.

20 Claims, 1 Drawing Sheet

Figure 1:
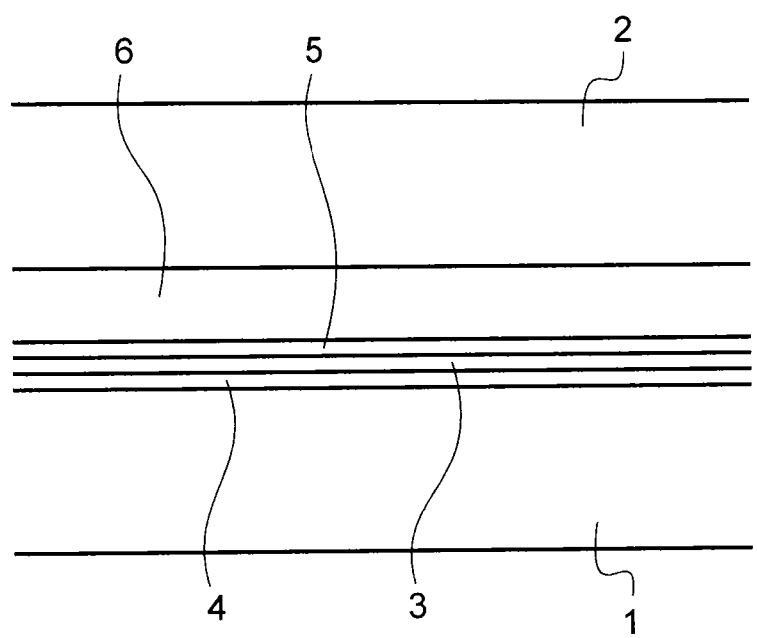

(51) Int. Cl.
  *H05B 3/00* (2006.01)
  *H05B 3/86* (2006.01)
  *B32B 17/10* (2006.01)

(52) U.S. Cl.
  CPC ......... *B32B 17/10761* (2013.01); *H05B 3/86* (2013.01); *H05B 2203/013* (2013.01)

(56) References Cited

U.S. PATENT DOCUMENTS

| | | | | |
|---|---|---|---|---|
| 5,911,899 A * | 6/1999 | Yoshikai | .................. | H05B 3/86 219/451.1 |
| 6,268,594 B1 | 7/2001 | Leutner et al. | | |
| 7,009,156 B2 * | 3/2006 | Maeuser | ........... | B32B 17/10036 219/202 |
| 8,686,319 B2 * | 4/2014 | Thiel | ................ | B32B 17/10036 219/203 |
| 8,946,597 B2 * | 2/2015 | Zagdoun et al. | ............. | 219/203 |
| 2002/0015824 A1 * | 2/2002 | Kawamoto | ....... | B32B 17/10036 428/156 |
| 2003/0150848 A1 * | 8/2003 | Noguchi | ........... | B32B 17/10036 219/203 |
| 2005/0089691 A1 * | 4/2005 | Noguchi | ........... | B32B 17/10174 428/426 |
| 2007/0157668 A1 | 7/2007 | Nadaud et al. | | |
| 2010/0062245 A1 * | 3/2010 | Martin | .............. | B32B 17/10174 428/336 |
| 2011/0198334 A1 * | 8/2011 | Zagdoun | ................. | C03C 17/23 219/203 |
| 2012/0080421 A1 | 4/2012 | Macher et al. | | |
| 2012/0234816 A1 * | 9/2012 | Petrenko | .................. | H05B 3/84 219/203 |
| 2013/0129945 A1 * | 5/2013 | Durandeau | ......... | C03C 17/3417 428/34 |
| 2013/0133734 A1 * | 5/2013 | Peter et al. | .................... | 136/256 |
| 2013/0228365 A1 * | 9/2013 | Uprety et al. | ................ | 174/257 |
| 2013/0299479 A1 * | 11/2013 | Laurent et al. | ............... | 219/203 |
| 2015/0232067 A1 * | 8/2015 | Schall | ..................... | H05B 3/86 219/203 |

FOREIGN PATENT DOCUMENTS

| | | |
|---|---|---|
| DE | 102 55 199 | 7/2003 |
| EP | 2 278 851 | 1/2011 |
| GB | 2 361 990 | 11/2001 |
| JP | 7-94263 | 4/1995 |
| JP | 07094263 A * | 4/1995 |
| JP | 7-196341 | 8/1995 |
| JP | 8-217499 | 8/1996 |
| JP | 2007-519826 | 7/2007 |

OTHER PUBLICATIONS

International Search Report Issued Sep. 13, 2012 in PCT/FR12/051221 Filed May 31, 2012.

Office Action dated Jan. 26, 2016, in corresponding Japanese Patent Application No. 2014-514130 (English Translation Provided).

* cited by examiner

FILM-TYPE HEATING ELEMENT

The invention relates to a heating element comprising a substrate equipped with a thin-film multilayer, the thin-film multilayer comprising a film suited to being heated.

It is known to use such heating elements as heated windshields for automotive vehicles in order to demist and/or deice the windshield. When the glazing unit is fitted to a vehicle and connected to an electrical system, the film suited to being heated becomes hot.

The power P dissipated by a heated windshield is equal to the voltage U applied to the windshield, squared, divided by the electrical resistance R of the heating film ($P=U^2/R$). The power dissipated to effectively demist and/or deice a windshield must be higher than 500 W/m$^2$. In vehicles with an internal combustion engine, the onboard voltage is about 12 or 42 volts. The heating films used are based on silver. They have a sheet resistance of about 1 or 4 Ω/square, respectively.

There is a need to provide electric vehicles with heated windshields. However, the onboard voltage of an electric vehicle is much higher than that onboard a vehicle with an internal combustion engine: it is about 100 volts or more, and may even be as high as several hundred volts. Thus, if a heated windshield designed for a vehicle with an internal combustion engine were fitted to an electric vehicle, the power dissipated by the windshield would be very high. Conventional electrical systems, such as those present onboard vehicles with an internal combustion engine, would not be able to withstand the very high dissipated electrical powers which would be generated by such a heated windshield if it were installed in an electric vehicle. Specific electrical systems would however be very expensive and difficult to implement.

In addition, it is also known to use heating elements with a heating film made of silver as electric radiators in buildings. The same high voltage problem arises since the voltage available in buildings is that of the national grid or mains, namely 220 or 230 volts in Europe or 120 volts in the United States, i.e. much higher than 12 or 42 volts. To decrease the power dissipated (in order to stop the radiator from getting too hot), the electrical resistance of the heating film is increased by etching the heating film so as to make the electrons follow a longer path. This process is however complex and expensive.

There is therefore a need for a heating element comprising a substrate equipped with a thin-film multilayer, the thin-film multilayer comprising a film suited to being heated, which can be easily installed in an electric vehicle or connected to the national grid and which is simple to manufacture.

For this purpose, the invention provides a heating element comprising a substrate equipped with a thin-film multilayer, the thin-film multilayer comprising a film suited to being heated, this film having a sheet resistance of between 20 and 200 Ω/square, the heating element also comprising two conductive collectors suited to being fed with electrical voltage, the film suited to being heated being a transparent electrically conductive oxide film and the film suited to being heated not being machined by etching and being electrically connected to the two conductive collectors, the film suited to being heated having a thickness of between 50 nm and 300 nm.

According to another feature, the transparent electrically conductive oxide film is:
  made of zinc oxide doped with an element chosen from the group Al, Ga, In, B, Ti, V, Y, Zr, Ge or with a combination of these various elements, preferably aluminum-doped zinc oxide (AZO), indium-doped zinc oxide (IZO), gallium-doped zinc oxide (GZO), or boron-doped zinc oxide (BZO); or
  made of indium tin oxide (ITO), or fluorine-doped tin oxide ($SnO_2$:F) or antimony-doped tin oxide ($SnO_2$:Sb); or
  made of niobium-doped titanium oxide.

According to another feature, the transparent electrically conductive oxide film is deposited by cathode sputtering, especially magnetron cathode sputtering, or by chemical vapor deposition (CVD).

According to another feature, the thin-film multilayer furthermore comprises a subjacent dielectric nonmetallic film located under the film suited to being heated, the dielectric nonmetallic film being made of a nitride or oxynitride or of an oxide or mixed oxide, for example of $Si_3N_4$ or $SiO_xN_y$ or SiOC or SiOSn.

According to another feature, the thin-film multilayer furthermore comprises, in particular when the transparent electrically conductive oxide film is made of doped zinc oxide or niobium-doped titanium oxide, a superjacent dielectric nonmetallic film located above the film suited to being heated, the dielectric nonmetallic film being made of a nitride, for example of $Si_3N_4$.

According to another feature, the conductive collectors are placed near two opposite edges of the heating element.

According to another feature, the substrate equipped with a thin-film multilayer is made of mineral or inorganic glass.

According to another feature, the substrate equipped with a thin-film multilayer is transparent.

According to another feature, the heating element furthermore comprises an interlayer and a second substrate, the interlayer being between the two substrates so as to form a laminate, the film suited to being heated facing the interlayer.

According to another feature, the heating element furthermore comprises a third substrate separated from the laminate by a gas-filled cavity.

According to another feature, the heating element comprises at least a second substrate, the substrates being separated pairwise by a gas-filled cavity so as to form an insulating multiple glazing unit, the film suited to being heated facing the gas-filled cavity.

According to another feature, the second substrate is made of inorganic or mineral glass.

According to another feature, the second substrate is transparent.

The invention also relates to an architectural glazing unit comprising a heating element as described above.

The invention also relates to a glazing unit for an electric automotive vehicle, said glazing unit comprising a heating element as described above.

The invention also relates to an electric automotive vehicle comprising a glazing unit as described above, the glazing unit especially being a windshield, a front side window, a rear side window, a rear window mirror or a sunroof.

The invention also relates to an electric radiator for a building, said radiator being formed by a heating element as described above.

Other features and advantages of the invention will now be described with regard to the drawings in which:

FIG. 1 shows a cross-sectional view of a heating element according to one embodiment of the invention.

The invention relates to a heating element comprising at least one substrate equipped with a thin-film multilayer, the thin-film multilayer comprising a film suited to being heated. The film suited to being heated has a sheet resistance of between 20 and 200 Ω/square. The film suited to being heated allows a glazing unit to be demisted/deiced or indeed a room to be heated. The film suited to being heated is a transparent electrically conductive oxide film. The heating element also comprises two conductive collectors suited to being fed with electrical voltage, the film suited to being heated being electrically connected to the two conductive collectors so that it can be heated. The film suited to being heated is unapertured, i.e. it is not machined by etching, i.e. no apertures, allowing the electrical resistance of the heating film to be increased, have been etched into it. Thus, no region has been removed from the film and no geometric path allowing the effective resistance of the glazing to be increased has been patterned by etching into the film suited to being heated.

Thus the sheet resistance of the film suited to being heated is between 20 and 200 Ω/square without it being necessary to machine it by etching. This simplifies the process used to manufacture the heating element. In addition, this ensures that the power dissipated can be controlled by and is compatible with conventional electrical systems. The invention therefore allows a heating element according to the invention to be easily installed in an electric vehicle or easily connected to the national grid.

FIG. 1 shows a cross-sectional view of a heating element according to one embodiment of the invention.

The heating element comprises a substrate 1 on which a thin-film multilayer comprising a film 3 suited to being heated has been deposited. The thin films of the multilayer are for example deposited by cathode sputtering, especially by magnetron cathode sputtering (magnetron deposition), or by chemical vapor deposition (CVD).

The substrate 1 is for example made of inorganic or mineral glass. It is for example transparent, in particular when it is used in an application requiring that it be seen through, for example in a vehicle or architectural glazing unit. The substrate 1 is preferably, but nonlimitingly, a glass sheet.

The film 3 suited to being heated is made of a transparent electrically conductive oxide film (TCO). Generally, the TCO film may be made of zinc oxide doped with an element chosen from the group Al, Ga, In, B, Ti, V, Y, Zr, Ge or with a combination of these various elements. When the film suited to being heated is deposited by magnetron, the TCO film is for example:
  made of aluminum-doped zinc oxide (AZO), indium-doped zinc oxide (IZO), or
  gallium-doped zinc oxide (GZO); or
  made of indium tin oxide (ITO), or antimony-doped tin oxide ($SnO_2$:Sb), or fluorine-doped tin oxide ($SnO_2$:F); or
  made of niobium-doped titanium oxide.

When the film suited to being heated is deposited by CVD, the TCO film is for example made of boron-doped zinc oxide (BZO), or fluorine-doped tin oxide ($SnO_2$:F). The BZO film is for example deposited by low-pressure CVD (LPCVD).

The thin-film multilayer also comprises a subjacent dielectric nonmetallic film 4 located under the film 3 suited to being heated. This subjacent dielectric nonmetallic film 4 is made of a nitride or oxynitride or an oxide or mixed oxide, for example of $Si_3N_4$ or $SiO_xN_y$ for magnetron-deposited films or of SiOC or SiOSn for CVD-deposited films. This subjacent film 4 acts as a barrier to alkali metals which otherwise could migrate during bending of the multilayer and destroy the conductivity of the TCO film, when the deposition is carried out by magnetron sputtering. The subjacent film also has a color modification function. A subjacent dielectric nonmetallic film 4 made of the mixed oxide SiOSn in particular permits good adhesion of a film 3 suited to being heated made of $SnO_2$:F and good resistance to delamination during bending of the glazing. The subjacent dielectric nonmetallic film 4 is for example deposited by cathode sputtering, especially magnetron sputtering, or by CVD. The subjacent dielectric nonmetallic film 4 is between 10 and 100 nm in thickness, for example between 40 and 70 nm in thickness and preferably about 50 nm in thickness.

When the heating element is used in an automotive glazing application requiring the glazing to be bent, the thin-film multilayer must be sufficiently strong and resistant to heat to withstand bending operations. If the TCO film is not sufficiently resistant, a superjacent dielectric nonmetallic film 5 made of nitride, for example of $Si_3N_4$, is deposited on the TCO film. The dielectric nonmetallic film 5 is deposited for example by cathode sputtering, especially magnetron cathode sputtering. The superjacent film 5 may modify the colors of the substrate. The superjacent dielectric nonmetallic film 5 has a thickness of between 10 and 100 nm and preferably of about 10 nm. A thickness of 10 nm is in theory sufficient to ensure the required protection.

The thickness of the film 3 suited to being heated is between 50 and 300 nm, preferably between 50 and 200 nm. This thickness range is both easily producible technically and allows a film of controlled thickness to be obtained over the entire surface of the glass sheet, the sheet resistance of the film suited to being heated being between 20 and 200 Ω/square.

The heating element also comprises two conductive collectors (not shown) placed near two opposite edges of the heating element. The film 3 suited to being heated is electrically connected to these conductive collectors. The conductive collectors are voltage supply terminals of the film 3 suited to being heated. In the case of a heated windshield, the conductive collectors are for example placed on the top and bottom of the windshield.

As a first variant, the heating element preferably comprises a second substrate 2 and an interlayer 6, the interlayer being between the two substrates 1, 2 so as to form a laminate. In this configuration, that face of the substrate 1 on which the thin-film multilayer is deposited preferably faces the interlayer 6 and is not oriented toward the exterior of the heating element, so as to protect the thin-film multilayer from external attack. The interlayer is for example made of standard PVB (polyvinyl butyral), or of a material suited to acoustically damping waves. The material suited to acoustically damping waves is then preferably placed between two films of standard PVB.

In this first variant, the second substrate 2 is, for example, made of inorganic or inorganic glass. It is for example transparent, in particular when it is used in an application requiring that it be seen through, for example in a vehicle or architectural glazing unit. The substrate 2 is preferably, but nonlimitingly, a glass sheet.

A heating element according to this first variant may be used in glazing for automotive vehicles, in particular for electric vehicles. When the glazing is a windshield or a front side window, it is subjected to visibility constraints. Specifically, the light transmission must be at least 70%, or even at least 75%, in order to meet the standards in force. This light transmission is achieved with a heated glazing unit such as defined above. In contrast, when the glazing is a rear side window, a rear window mirror or a sunroof, there are no constraints on its light transmission. To decrease light transmission while respecting the standards in force, which may require a light transmission of near 100%, the substrate may be tinted or indeed the multilayer may comprise an absorbing film, for example made of NiCr or NbN.

A heating element according to this first variant may also be used in architectural glazing units, for example in partitions between two rooms or in curtain walling, in combination with a third substrate separated from the heating element by a gas-filled cavity. The third substrate is for example made of mineral or inorganic glass. The third substrate is for example transparent.

A heating element according to this first variant may also be used in an electric radiator for a building.

As a second variant, the heating element comprises at least a second substrate 2. The substrates 1, 2 are separated pairwise by a gas-filled cavity so as to form an insulating multiple glazing unit. The thin-film multilayer preferably faces the gas-filled cavity and is not oriented toward the exterior of the heating element, so as to protect the thin-film multilayer from external attack.

A heating element according to this second variant may be used in an architectural glazing unit.

The invention therefore also relates to a glazing unit for an automotive electric vehicle, in particular a windshield or a front side window, which must have a light transmission of at least 70%, or even at least 75%, or alternatively to a rear side window, a rear window or indeed a sunroof, which are not subject to any light transmission constraints. The invention also relates to an automotive electric vehicle fitted with such a glazing unit. The invention also relates to an architectural glazing unit and to an electric radiator for a building.

In the case of a vehicle or architectural glazing unit or an electric radiator for a building, the conductive collectors are connected in a known way to an electrical system and are fed with a voltage via this electrical system. When it is under voltage, the film suited to being heated becomes a heating film. By virtue of the invention, conventional electrical systems may be used.

In the case of a vehicle or architectural glazing unit, one object of the film suited to being heated is to demist and/or deice the glazing unit.

In the case of a radiator, the film suited to being heated is essentially intended for domestic heating but may also be for a demisting application, in particular when it is used in a bathroom.

Examples are given below. They may all be used in any of the applications provided for by the invention, even if the dissipated power has been calculated for a windshield after bending.

A heating element according to the invention having the following multilayer:

Glass/Si$_3$N$_4$/AZO/Si$_3$N$_4$/PVB/Glass with, in order, the following thicknesses:

| | material | | | | |
|---|---|---|---|---|---|
| | Glass | Si$_3$N$_4$ | AZO | Si$_3$N$_4$ | PVB | Glass |
| thickness | 2 mm | 50 nm | 160 nm | 50 nm | 0.76 mm | 2 mm | had a sheet resistance of 30 Ω/square. In this example, the AZO film was the film suited to being heated. A heating element 75 cm in height, fed with a voltage of 220 V, then dissipated a power per unit area of 2870 W/m² and had a light transmission of 82.5%.

Likewise, a heating element according to the invention having the following multilayer:

Glass/Si$_3$N$_4$/SnO$_2$:F/PVB/Glass with, in order, the following thicknesses:

| | material | | | | |
|---|---|---|---|---|---|
| | Glass | Si$_3$N$_4$ | SnO$_2$:F | PVB | Glass |
| thickness | 2 mm | 50 nm | 50 nm | 0.76 mm | 2 mm | had a sheet resistance of 100 Ω/square. In this example, the SnO$_2$:F film was the film suited to being heated. A heating element 75 cm in height, fed with a voltage of 220 V, then dissipated a power per unit area of 860 W/m² and had a light transmission of 85%.

Likewise, a heating element according to the invention having the following multilayer:

Glass/Si$_3$N$_4$/SnO$_2$:F/PVB/Glass with, in order, the following thicknesses:

| | material | | | | |
|---|---|---|---|---|---|
| | Glass | Si$_3$N$_4$ | SnO$_2$:F | PVB | Glass |
| thickness | 2 mm | 50 nm | 70 nm | 0.76 mm | 2 mm | had a sheet resistance of 70 Ω/square. In this example, the SnO$_2$:F film was the film suited to being heated. A heating element 75 cm in height, fed with a voltage of 220 V, then dissipated a power per unit area of 1129 W/m² and had a light transmission of 84.5%.

A heating element according to the invention having the following multilayer:

Glass/Si$_3$N$_4$/GZO/Si$_3$N$_4$/PVB/Glass with, in order, the following thicknesses:

| | material | | | | |
|---|---|---|---|---|---|
| | Glass | Si$_3$N$_4$ | GZO (5 wt %) | Si$_3$N$_4$ | PVB | Glass |
| thickness | 2 mm | 50 nm | 100 nm | 50 nm | 0.76 mm | 2 mm | had a sheet resistance of 60 Ω/square. In this example, the AZO film was the film suited to being heated. A heating element 75 cm in height, fed with a voltage of 220 V, then dissipated a power per unit area of 1434 W/m² and had a transmission of 83%.

A heating element according to the invention having the following multilayer:

Glass/Si$_3$N$_4$/AZO/Si$_3$N$_4$/PVB/Glass with, in order, the following thicknesses:

| | | material | | | |
|---|---|---|---|---|---|
| | | AZO | | | |
| | Glass | $Si_3N_4$ | (2 wt %) | $Si_3N_4$ | PVB | Glass |
| thickness | 2 mm | 50 nm | 100 nm | 50 nm | 0.76 mm | 2 mm | had a sheet resistance of 60 Ω/square. In this example, the AZO film was the film suited to being heated. A heating element 75 cm in height, fed with a voltage of 220 V, then dissipated a power per unit area of 1434 $W/m^2$ and had a transmission of 83%.

A heating element according to the invention having the following multilayer:

Glass/$Si_3N_4$/AZO/$Si_3N_4$/PVB/Glass with, in order, the following thicknesses:

| | | material | | | |
|---|---|---|---|---|---|
| | | $TiO_2$:Nb | | | |
| | Glass | $Si_3N_4$ | (5 wt %) | $Si_3N_4$ | PVB | Glass |
| thickness | 2 mm | 50 nm | 100 nm | 50 nm | 0.76 mm | 2 mm | had a sheet resistance of 150 Ω/square. In this example, the $TiO_2$:Nb film was the film suited to being heated. A heating element 75 cm in height, fed with a voltage of 220 V, then dissipated a power per unit area of 574 $W/m^2$ and had a transmission of 75%.

A heating element according to the invention having the following multilayer:

Glass/$Si_3N_4$/AZO/$Si_3N_4$/PVB/Glass with, in order, the following thicknesses:

| | | material | | | |
|---|---|---|---|---|---|
| | | ITO (90% In | | | |
| | Glass | $Si_3N_4$ | and 10% Sn) | $Si_3N_4$ | PVB | Glass |
| thickness | 2 mm | 50 nm | 60 nm | 50 nm | 0.76 mm | 2 mm | had a sheet resistance of 35 Ω/square. In this example, the ITO film was the film suited to being heated. A heating element 75 cm in height, fed with a voltage of 220 V, then dissipated a power per unit area of 2458 $W/m^2$ and had a transmission of 83%.

The invention claimed is:
1. A heating element, comprising:
a substrate equipped with a thin-film multilayer, the thin-film multilayer comprising a transparent electrically conductive oxide film, wherein the transparent electrically conductive oxide film is made of:
zinc oxide doped with Al, Ga, In, B, Ti, V, Y, Zr, or Ge, or any combination thereof;
indium tin oxide (ITO), fluorine-doped tin oxide ($SnO_2$: F), antimony-doped tin oxide ($SnO_2$:Sb), or any combination thereof; or
niobium-doped titanium oxide, and
two conductive collectors suitable for being fed with electrical voltage,
wherein a sheet resistance of the transparent electrically conductive oxide film is between 20 and 200 Ω/square,
the thin-film multilayer further comprises a subjacent dielectric nonmetallic film comprising a nitride, an oxynitride, or an oxide under the transparent electrically conductive oxide film;
the transparent electrically conductive oxide film is suitable for being heated,
the transparent electrically conductive oxide film is not obtained by a process comprising machining by etching,
the transparent electrically conductive oxide film is electrically connected to the two conductive collectors, and
the transparent electrically conductive oxide film has a thickness of between 50 nm and 200 nm.
2. The heating element of claim 1, wherein the transparent electrically conductive oxide film is obtained by a process comprising cathode sputtering, or comprising chemical vapor deposition (CVD).
3. The heating element of claim 1, wherein the thin-film multilayer further comprises a superjacent dielectric nonmetallic film comprising a nitride above the transparent electrically conductive oxide film.
4. The heating element of claim 1, wherein the conductive collectors are near two opposite edges of the heating element.
5. The heating element of claim 1, wherein the substrate comprises mineral or inorganic glass.
6. The heating element of claim 1, wherein the substrate is transparent.
7. The heating element of claim 1, further comprising a second substrate and an interlayer between the substrate and the second substrate, thereby forming a laminate,
wherein the transparent electrically conductive oxide film faces the interlayer.
8. The heating element of claim 7, further comprising a third substrate separated from the laminate by a gas-filled cavity.
9. The heating element of claim 1, further comprising a second substrate separated from the substrate by a gas-filled cavity, thereby forming an insulating multiple glazing unit,
wherein the transparent electrically conductive oxide film faces the gas-filled cavity.
10. The heating element of claim 7, the second substrate comprises inorganic or mineral glass.
11. The heating element of claim 7, wherein the second substrate is transparent.
12. An architectural glazing unit comprising the heating element of claim 1.
13. A glazing unit, comprising the heating element according to claim 1,
wherein the glazing unit is suitable for an electric automotive vehicle.
14. An electric automotive vehicle comprising the glazing unit of claim 13.
15. An electric radiator comprising the heating element of claim 1.
16. The heating element of claim 1, wherein the subjacent dielectric nonmetallic film comprises $Si_3N_4$, $SiON_y$, SiOC, or SiOSn.
17. The heating element of claim 3, wherein the superjacent dielectric nonmetallic film comprises $Si_3N_4$.
18. A heating element, comprising:
a substrate equipped with a thin-film multilayer, the thin-film multilayer comprising a transparent electrically conductive oxide film, wherein the transparent electrically conductive oxide film is made of:
zinc oxide doped with Al, Ga, In, B, Ti, V, Y, Zr, or Ge, or any combination thereof;

indium tin oxide (ITO), fluorine-doped tin oxide ($SnO_2$:F), antimony-doped tin oxide ($SnO_2$:Sb), or any combination thereof; or niobium-doped titanium oxide, and two conductive collectors suitable for being fed with electrical voltage, wherein a sheet resistance of the transparent electrically conductive oxide film is between 20 and 200 Ω/square, the thin-film multilayer further comprises a superjacent dielectric nonmetallic film comprising a nitride above the transparent electrically conductive oxide film;

the transparent electrically conductive oxide film is suitable for being heated, the transparent electrically conductive oxide film is not obtained by a process comprising machining by etching, the transparent electrically conductive oxide film is electrically connected to the two conductive collectors, and the transparent electrically conductive oxide film has a thickness of between 50 nm and 200 nm.

19. The heating element of claim 18, wherein the superjacent dielectric nonmetallic film comprises $Si_3N_4$.

20. A heating element, comprising:

a substrate equipped with a thin-film multilayer, the thin-film multilayer comprising a transparent electrically conductive oxide film, wherein the transparent electrically conductive oxide film is made of:

zinc oxide doped with Al, Ga, In, B, Ti, V, Y, Zr, or Ge, or any combination thereof;

indium tin oxide (ITO), fluorine-doped tin oxide ($SnO_2$:F), antimony-doped tin oxide ($SnO_2$:Sb), or any combination thereof; or niobium-doped titanium oxide, and two conductive collectors suitable for being fed with electrical voltage, wherein a sheet resistance of the transparent electrically conductive oxide film is between 20 and 200 Ω/square, the transparent electrically conductive oxide film is suitable for being heated, the transparent electrically conductive oxide film is not obtained by a process comprising machining by etching, the transparent electrically conductive oxide film is electrically connected to the two conductive collectors, and the transparent electrically conductive oxide film has a thickness of between 50 nm and 200 nm.

\* \* \* \* \*